United States Patent
Choate

(10) Patent No.: US 7,711,975 B2
(45) Date of Patent: May 4, 2010

(54) UNIVERSAL SERIAL BUS ADAPTIVE SIGNAL RATE

(75) Inventor: James J. Choate, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1388 days.

(21) Appl. No.: 11/026,696

(22) Filed: Dec. 30, 2004

(65) Prior Publication Data

US 2006/0168466 A1 Jul. 27, 2006

(51) Int. Cl.
*G06F 1/12* (2006.01)
*G06F 1/14* (2006.01)
*G06F 5/06* (2006.01)

(52) U.S. Cl. .................. 713/600; 713/500; 713/501; 713/502; 709/227; 709/228

(58) Field of Classification Search .......... 713/600, 713/500, 501, 502; 709/227, 228
See application file for complete search history.

(56) References Cited

U.S. PATENT DOCUMENTS

| | | | |
|---|---|---|---|
| 4,734,637 A | 3/1988 | Chen et al. | |
| 5,978,417 A * | 11/1999 | Baker et al. | 375/232 |
| 6,321,282 B1 | 11/2001 | Horowitz et al. | |
| 6,453,374 B1 * | 9/2002 | Kovalan et al. | 710/100 |
| 6,523,080 B1 * | 2/2003 | Blackmon et al. | 710/305 |
| 7,366,930 B2 * | 4/2008 | Gutman et al. | 713/320 |
| 2002/0199051 A1 | 12/2002 | Fukae et al. | |
| 2004/0049616 A1 | 3/2004 | Dunstan et al. | |
| 2004/0168081 A1 * | 8/2004 | Ladas et al. | 713/201 |
| 2004/0208180 A1 | 10/2004 | Light et al. | |
| 2005/0071514 A1 * | 3/2005 | Anderson et al. | 710/1 |
| 2005/0262364 A1 * | 11/2005 | Diab et al. | 713/300 |
| 2006/0047881 A1 * | 3/2006 | Turner et al. | 710/313 |

FOREIGN PATENT DOCUMENTS

CN 1509041 A 6/2004

OTHER PUBLICATIONS

PCT/US2005/046954 Internation Search Report and Written Opinion Mailed May 23, 2006.
Universal Serial Bus Specification—Compaq HP Intel Lucent MS MEC Philips—Rev. 2.0 Apr. 27, 2000—pp. 119-194.
International Preliminary Report on Patentability, International Application No. PCT/US2005/046954, mailed Jul. 12, 2007, 8 pages.
Becke, Georg et al.," Comparing Bus Solutions" Texas Instruments, Application Report SLLA067A, Feb. 2004, pp. 1-79.

* cited by examiner

*Primary Examiner*—Thomas Lee
*Assistant Examiner*—Michael J Brown
(74) *Attorney, Agent, or Firm*—Robert D. Anderson

(57) ABSTRACT

In some embodiments it is determined if a speed of a Universal Serial Bus cable of greater than 480 Mb per second is supported at each end of the Universal Serial Bus cable, the length of the Universal Serial Bus cable is calculated, and the speed of the Universal Serial Bus cable is increased beyond 480 Mb per second in response to the determining and the calculating. Other embodiments are described and claimed.

51 Claims, 2 Drawing Sheets

UNIVERSAL SERIAL BUS ADAPTIVE SIGNAL RATE

TECHNICAL FIELD

The inventions generally relate to Universal Serial Bus (USB) adaptive signal rate (ASR).

BACKGROUND

Serial buses are now used to interface peripheral devices to a computer system. Examples of these buses include the Universal Serial Bus (USB) and the Institute of Electrical and Electronic Engineers (IEEE) 1394 standard bus. These serial buses provide a simple method of attaching and accessing peripheral devices.

For example, the USB is a new standard that complements the traditional interfaces via the microprocessor bus such as the Peripheral Component Interconnect (PCI), Industry Standard Architecture (ISA), or Enhanced Industry Standard Architecture (EISA) buses. Advantages of the USB include plug and play support, hot attachment, expandability, legacy hardware and software support, and low cost.

A USB-based system typically includes one or more USB clients (USB clients are also referred to interchangeably as "USB devices", "USB client devices", etc.), a USB host controller, and one or more hubs. Examples of USB devices are USB-compatible digital cameras, printers, keyboards, scanners, modems, and digital phones. All USB devices attach directly to a USB host (or host controller) or via a USB hub that provides one or more ports. Original USB (USB 1.1) supports two different speeds: 1.5 megabits (Mbits) per second (Mbps) for low-speed devices (referred to as "LS" or low speed) and 12 MBits/second (Mbps) for high-speed devices (referred to as "FS" or full speed). USB 2.0 (Hi-Speed USB) supports a speed of 480 Mbps (referred to as "HS" or high speed).

USB makes plugging in new peripherals easy with plug and play, is much faster (approximately 100 times faster) than the original serial port, and supports multiple device connectivity. Because of these benefits, USB is enjoying broad market acceptance. USB allows expandability of the capabilities of a computer via an external port, eliminating the need for users or integrators to open the system chassis. Since USB supports multiple peripheral devices simultaneously, it allows users to run numerous devices such as printers, scanners, digital cameras and speakers from a single computer (for example, a PC). USB also allows for automatic device detection and installation, making connectivity a true plug-and-play experience for end users. Virtually every new PC today has one or more USB ports, quickly moving the installed base of USB-capable PCs to the range of hundreds of millions. However, USB 2.0 devices currently allow a maximum signal rate of 480 Mb/s.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to Universal Serial Bus (USB) adaptive signal rate (ASR).

In some embodiments it is determined if a speed of a Universal Serial Bus cable of greater than 480 Mb per second is supported at each end of the Universal Serial Bus cable, the length of the Universal Serial Bus cable is calculated, and the speed of the Universal Serial Bus cable is increased beyond 480 Mb per second in response to the determining and the calculating.

In some embodiments an article includes a computer readable medium having instructions thereon which when executed cause a computer to determine if a speed of a Universal Serial Bus cable of greater than 480 Mb per second is supported at each end of the Universal Serial Bus cable, calculate the length of the Universal Serial Bus cable, and increase the speed of the Universal Serial Bus cable beyond 480 Mb per second in response to the determining and the calculating.

In some embodiments a system includes a Universal Serial Bus cable and a Universal Serial Bus host. The Universal Serial Bus host is to determine if a speed of the Universal Serial Bus cable of greater than 480 Mb per second is supported at each end of the Universal Serial Bus cable, to calculate the length of the Universal Serial Bus cable, and to increase speed of the Universal Serial Bus cable beyond 480 Mb per second.

Figure 1:
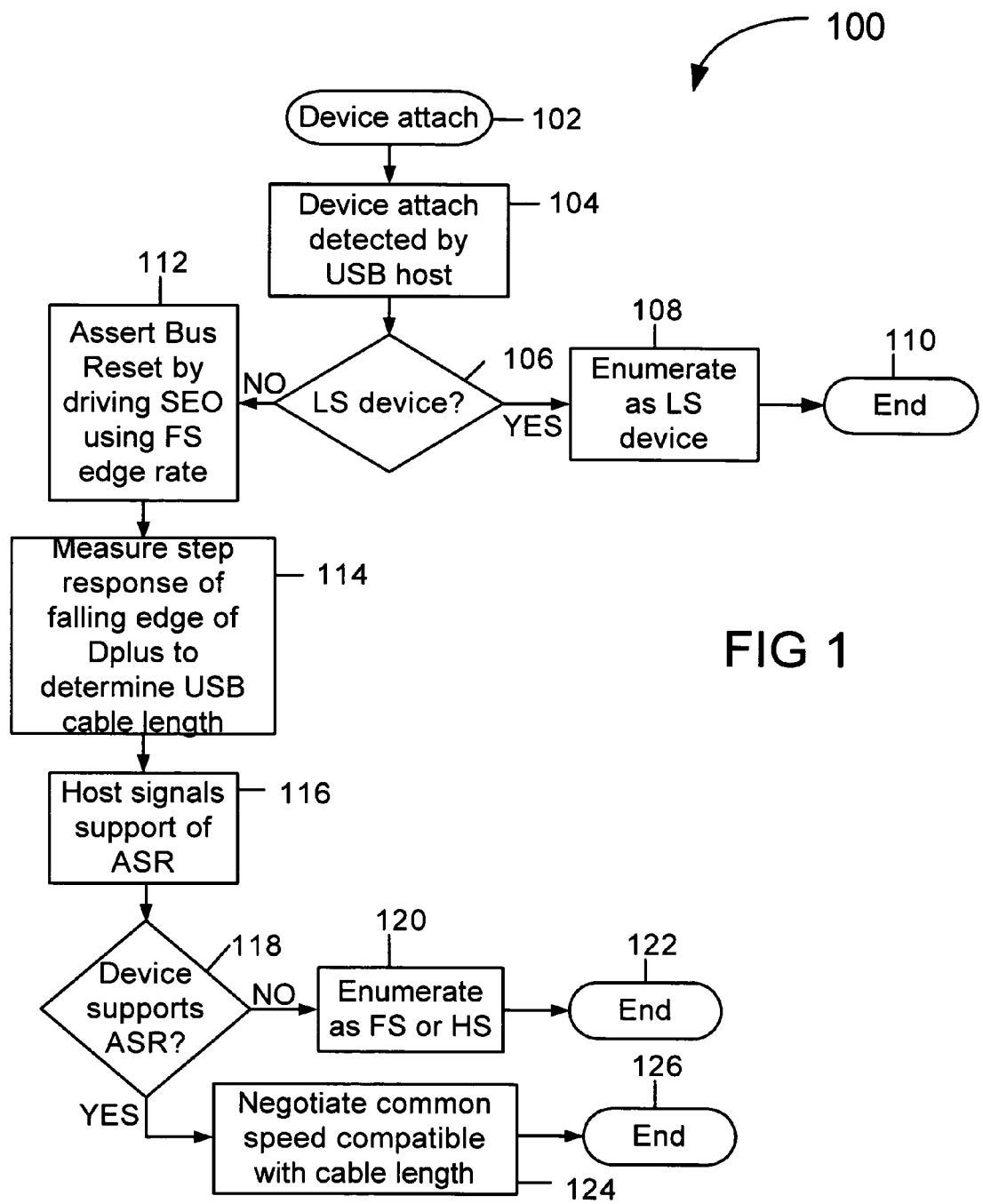
FIG. 1 illustrates a flowchart according to some embodiments of the inventions.

FIG. 1 illustrates a flowchart 100 according to some embodiments. In some embodiments flowchart 100 is referred to as an adaptive signal rate (ASR) flowchart. A device (for example, a USB device) is attached at 102. A USB host (and/or USB hub) detects the attachment of the USB device at 104. A determination is made at 106 as to whether the USB device is an LS (low speed) device. If the USB device is determined as an LS device at 106 it is enumerated as such at box 108 and flow ends at 110. If the USB device is determined at 106 to not be an LS device then a bus reset is asserted at 112 by driving a Single Ended Zero (SEO) using an FS (full speed) edge rate. A Single Ended Zero (SEO) is defined as the bus condition where both of the USB differential data lines (DPlus and DMinus) are below 0.8 Volts. Refer to the Universal Serial Bus Specification Revision 2.0 for more detail. The step response of the falling edge of the USB DPlus signal is measured at 114 to determine the USB cable length between the USB host (USB hub) and the USB device. For example, a lookup table may be used to determine the USB cable length based on the measured step response of the falling edge of the DPlus signal. Increased measurement accuracy may require that this reset and step response measurement be performed multiple times. Like the USB HS Chirp K handshake used between USB 2.0 products to indicate support for High-speed, support for additional bus speeds beyond HS (480 Mb per second) must be communicated between the host and device. The Adaptive Signal Rate (ASR) handshake could be initiated by either the host or device. For a device initiated example, support for Adaptive Signal Rate (ASR) could be indicated by a device responding to the host reset with a Chirp J for a duration of 1.0 ms to 7.0 ms (Refer to the Universal Serial Bus Specification Revision 2.0 for more detail on Chirp J). The host response to the Chirp J condition could be initiation of a Chirp J-K repeating response. For a host initiated example, the host could respond to the Device HS Chirp K response by driving a sustained Chirp J (or K) as indication that the host supports Adaptive Signal Rate (ASR). The device could then respond by driving a Chirp J in response. For explanation purposes, FIG. 1 assumes the handshake is host initiated, but other embodiments exist in which the handshake is not host initiated. The USB host signals a support of adaptive signal rate (ASR) at 116. If the device supports adaptive signal rate (ASR) it will respond accordingly at 118. A determination is made by the host at 118 as to whether the USB device supports ASR at 118. If the USB host or device does not support adaptive signal rate (ASR) then it is enumerated as either an FS (full speed) or an HS (high speed) device at 120 and flow ends at 122. If the determination at 118 is that both the USB host and USB device support ASR then a common speed that is compatible with the USB cable length is negotiated between the USB host (or USB hub) and the USB device at 124. Flow then ends at 126.

Figure 2:
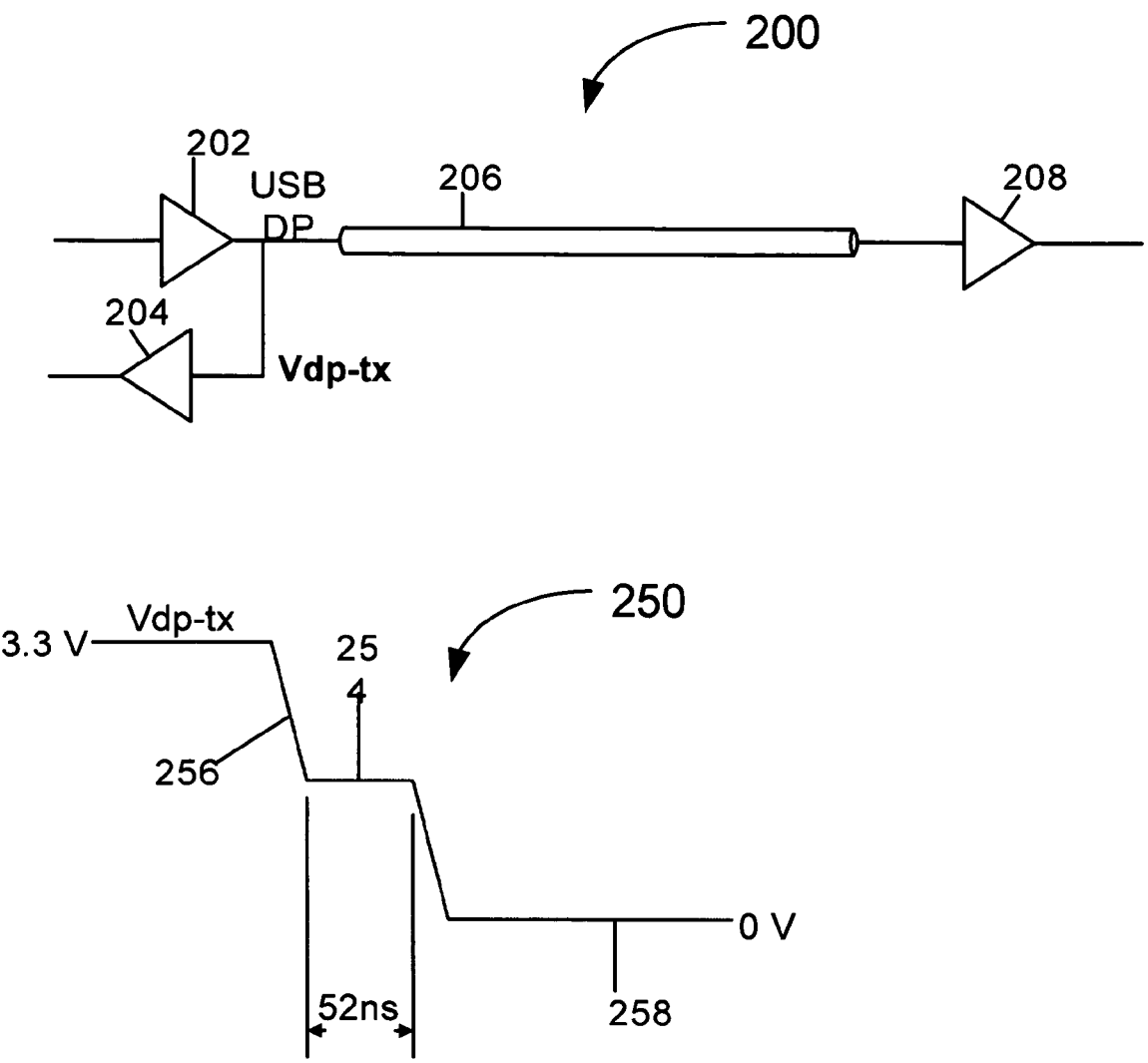
FIG. 2 illustrates measurement of USB cable length according to some embodiments of the inventions.

FIG. 2 illustrates measurement of USB cable length according to some embodiments of the inventions. FIG. 2 includes a system 200 and an electrical timing diagram 250. System 200 includes a host transmission buffer 202, a host receiver buffer 204, a USB cable 206, and a device receiver buffer 208. For purposes of explanation the non-cable interconnect length (motherboard pcb trace, device pcb trace, etc) will be assumed to be negligible (zero). In some embodiments the length of the USB cable 206 is measured using, for example, active bus signaling. The USB host transmits (drives) a FS edge rate reset signal 250, for example. The initial transition of the reset starts at 256. A step response is illustrated at 254, and the end of the step response at 258. The step response at 254 occurs due to the transmission line effects of the FS termination impedance and FS driver characteristics. The duration of the step response is determined by the round trip propagation delay through the USB cable. The step response for cable is measured, for example as 52 ns as illustrated in FIG. 2, which is the approximate round trip signal reflection time that would indicate that the USB cable is 5 meters, the maximum length allowed by USB.

In some embodiments a USB host (or a USB hub) supporting adaptive signal rate (ASR) is connected to a USB device that also supports ASR. This allows a link speed to be negotiated that is higher than the current USB 2.0 maximum speed of 480 Mb/s. In some embodiments this higher speed is negotiated based on length of the USB cable and a common speed supported by both ends of the link.

In some embodiments the negotiation of the higher speed includes a bus handshake to determine whether a speed of greater than 480 Mb/s is supported, a determination of the length of the USB cable connecting the two components, and then negotiation to the new higher speed. In some embodiments the USB cable length is determined by measuring the step response of an incident voltage edge. In some embodiments the open voltage step of the falling edge of the host driven bus reset is measured. The step response delta time for a FS (Full Speed) edge rate is the round trip propagation delay of the USB cable. By dividing by two to obtain the propagation delay of the cable the electrical length of the USB cable may be determined. In some embodiments look up tables are used so that the transmitter is able to determine the maximum link speed that could be supported.

Current USB 2.0 allows a maximum signal rate of 480 Mb/s. Since the USB 2.0 Specification allows up to 5 meters of USB cable it is difficult to increase the bit rate while maintaining backward compatibility. In some embodiments bit rates may be increased beyond the 480 Mb/s maximum, while maintaining backward compatibility. This is accomplished, for example, by detecting when the maximum length USB cable is used and running at the current limit of 480 Mb/s, but running at faster speeds when the cable is shorter than the 5 meter limit.

In some embodiments active bus signaling is used to increase the transmission speed of a USB cable while maintaining backward compatibility with existing USB speeds and cables. In some embodiments anyone designing high data rate USB products would benefit by the increased bit rate (for example, vendors of streaming audio and video capture devices, USB cameras, DVD players, etc.)

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state, or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
   determining if a speed of a Universal Serial Bus cable of greater than a high speed is supported at each end of the Universal Serial Bus cable;
   calculating the length of the Universal Serial Bus cable by monitoring an open voltage step of a falling edge of a host driven bus reset; and
   increasing speed of the Universal Serial Bus cable beyond the high speed in response to the determining and the calculating.

2. The method of claim 1, wherein if the speed of the Universal Serial Bus cable of greater than the high speed is not supported at each end of the Universal Serial Bus cable, then not increasing the speed of the Universal Serial Bus cable beyond the high speed.

3. The method of claim 1, wherein if the calculated length of the Universal Serial Bus cable is 5 meters or more, then not increasing the speed of the Universal Serial Bus cable beyond the high speed.

4. The method of claim 1, wherein if the speed of the Universal Serial Bus cable of greater than the high speed is supported at each end of the Universal Serial Bus cable and if the calculated length of the Universal Serial Bus cable is less than 5 meters, then increasing the speed of the Universal Serial Bus cable beyond the high speed.

5. The method of claim 1, further comprising negotiating a common speed that is compatible with the calculated Universal Serial Bus cable length.

6. The method of claim 1, wherein the calculating is performed using active bus signaling.

7. The method of claim 1, wherein the high speed is 480 Mb per second.

8. The method of claim 1, wherein the calculating is performed by obtaining a round trip propagation delay time through the Universal Serial Bus cable.

9. An article comprising:
   a computer readable medium having instructions thereon which when executed cause a computer to:
   determine if a speed of a Universal Serial Bus cable of greater than a high speed is supported at each end of the Universal Serial Bus cable;
   calculate the length of the Universal Serial Bus cable by monitoring an open voltage step of a falling edge of a host driven bus reset; and
   increase speed of the Universal Serial Bus cable beyond the high speed in response to the determined speed support and the calculated length.

10. The article of claim 9, the computer readable medium further having instructions thereon which when executed cause a computer to not increase the speed of the Universal Serial Bus cable beyond the high speed if the speed of the Universal Serial Bus cable of greater than the high speed is not supported at each end of the Universal Serial Bus cable.

11. The article of claim 9, the computer readable medium further having instructions thereon which when executed cause a computer to not increase the speed of the Universal Serial Bus cable beyond the high speed if the calculated length of the Universal Serial Bus cable is 5 meters or more.

12. The article of claim 9, the computer readable medium further having instructions thereon which when executed cause a computer to increase the speed of the Universal Serial Bus cable beyond the high speed if the speed of the Universal Serial Bus cable of greater than the high speed is supported at each end of the Universal Serial Bus cable and if the calculated length of the Universal Serial Bus cable is less than 5 meters.

13. The article of claim 9, the computer readable medium further having instructions thereon which when executed cause a computer to negotiate a common speed that is compatible with the calculated Universal Serial Bus cable length.

14. The article of claim 9, the computer readable medium further having instructions thereon which when executed cause a computer to calculate the length of the Universal Serial Bus cable using adaptive bus signaling.

15. The article of claim 9, wherein the high speed is 480 Mb per second.

16. The article of claim 9, the computer readable medium further having instructions thereon which when executed cause a computer to:
   obtain a round trip propagation delay time through the Universal Serial Bus cable.

17. A system comprising:
   a Universal Serial Bus cable; and
   a Universal Serial Bus host to determine if a speed of the Universal Serial Bus cable of greater than a high speed is supported at each end of the Universal Serial Bus cable, to calculate the length of the Universal Serial Bus cable by monitoring an open voltage step of a falling edge of a host driven bus, and to increase speed of the Universal Serial Bus cable beyond the high speed.

18. The system of claim 17, wherein if the speed of the Universal Serial Bus cable of greater than the high speed is not supported at each end of the Universal Serial Bus cable, then the Universal Serial Bus host to not increase the speed of the Universal Serial Bus cable beyond the high speed.

19. The system of claim 17, wherein if the calculated length of the Universal Serial Bus cable is 5 meters or more, then the Universal Serial Bus host to not increase the speed of the Universal Serial Bus cable beyond the high speed.

20. The system of claim 17, wherein if the speed of the Universal Serial Bus cable of greater than the high speed is supported at each end of the Universal Serial Bus cable and if the calculated length of the Universal Serial Bus cable is less than 5 meters, then the Universal Serial Bus host to increase the speed of the Universal Serial Bus cable beyond the high speed.

21. The system of claim 17, the Universal Serial Bus host to negotiate a common speed that is compatible with the calculated Universal Serial Bus cable length.

22. The system of claim 17, wherein the Universal Serial Bus host is to use active bus signaling to calculate the length of the Universal Serial Bus cable.

23. The system of claim 17, wherein the high speed is 480 Mb per second.

24. The system of claim 17, the Universal Serial Bus host to calculate the length of the Universal Serial Bus cable by obtaining a round trip propagation delay time through the Universal Serial Bus cable.

25. An apparatus comprising:
a Universal Serial Bus device to determine if a speed of a Universal Serial Bus cable of greater than a high speed is supported at each end of the Universal Serial Bus cable, to calculate the length of the Universal Serial Bus cable by monitoring an open voltage step of a falling edge of a driven bus reset and to increase speed of the Universal Serial Bus cable beyond the high speed.

26. The apparatus of claim 25, wherein if the speed of the Universal Serial Bus cable of greater than the high speed is not supported at each end of the Universal Serial Bus cable, then the Universal Serial Bus device to not increase the speed of the Universal Serial Bus cable beyond the high speed.

27. The apparatus of claim 25, wherein if the calculated length of the Universal Serial Bus cable is 5 meters or more, then the Universal Serial Bus device to not increase the speed of the Universal Serial Bus cable beyond the high speed.

28. The apparatus of claim 25, wherein if the speed of the Universal Serial Bus cable of greater than the high speed is supported at each end of the Universal Serial Bus cable and if the calculated length of the Universal Serial Bus cable is less than 5 meters, then the Universal Serial Bus host to increase the speed of the Universal Serial Bus cable beyond the high speed.

29. The apparatus of claim 25, the Universal Serial Bus device to negotiate a common speed that is compatible with the calculated Universal Serial Bus cable length.

30. The apparatus of claim 25, wherein the Universal Serial Bus device is to use active bus signaling to calculate the length of the Universal Serial Bus cable.

31. The apparatus of claim 25, wherein the Universal Serial Bus device is a Universal Serial Bus host.

32. The apparatus of claim 25, wherein the high speed is 480 Mb per second.

33. The apparatus of claim 25, the Universal Serial Bus device to calculate the length of the Universal Serial Bus cable by obtaining a round trip propagation delay time through the Universal Serial Bus cable.

34. A method comprising:
determining if a speed of a Universal Serial Bus cable of greater than a high speed is supported at each end of the Universal Serial Bus cable;
calculating the length of the Universal Serial Bus cable using a step response of the falling edge of a Universal Serial Bus DPlus signal; and
increasing speed of the Universal Serial Bus cable beyond the high speed in response to the determining and the calculating.

35. The method of claim 34, wherein if the speed of the Universal Serial Bus cable of greater than the high speed is not supported at each end of the Universal Serial Bus cable, then not increasing the speed of the Universal Serial Bus cable beyond the high speed.

36. The method of claim 34, wherein if the calculated length of the Universal Serial Bus cable is 5 meters or more, then not increasing the speed of the Universal Serial Bus cable beyond the high speed.

37. The method of claim 34, further comprising negotiating a common speed that is compatible with the calculated Universal Serial Bus cable length.

38. An article comprising:
a computer readable medium having instructions thereon which when executed cause a computer to:
determine if a speed of a Universal Serial Bus cable of greater than a high speed is supported at each end of the Universal Serial Bus cable;
calculate the length of the Universal Serial Bus cable by using a step response of the falling edge of a Universal Serial Bus DPlus signal; and
increase speed of the Universal Serial Bus cable beyond the high speed in response to the determined speed support and the calculated length.

39. The article of claim 38, the computer readable medium further having instructions thereon which when executed cause a computer to not increase the speed of the Universal Serial Bus cable beyond the high speed if the speed of the Universal Serial Bus cable of greater than the high speed is not supported at each end of the Universal Serial Bus cable.

40. The article of claim 38, the computer readable medium further having instructions thereon which when executed cause a computer to not increase the speed of the Universal Serial Bus cable beyond the high speed if the calculated length of the Universal Serial Bus cable is 5 meters or more.

41. The article of claim 38, the computer readable medium further having instructions thereon which when executed cause a computer to negotiate a common speed that is compatible with the calculated Universal Serial Bus cable length.

42. A system comprising:
a Universal Serial Bus cable; and
a Universal Serial Bus host to determine if a speed of the Universal Serial Bus cable of greater than a high speed is supported at each end of the Universal Serial Bus cable, to calculate the length of the Universal Serial Bus cable using a step response of the falling edge of a Universal Serial Bus DPlus signal, and to increase speed of the Universal Serial Bus cable beyond the high speed.

43. The system of claim 42, wherein if the speed of the Universal Serial Bus cable of greater than the high speed is not supported at each end of the Universal Serial Bus cable, then the Universal Serial Bus host to not increase the speed of the Universal Serial Bus cable beyond the high speed.

44. The system of claim 42, wherein if the calculated length of the Universal Serial Bus cable is 5 meters or more, then the Universal Serial Bus host to not increase the speed of the Universal Serial Bus cable beyond the high speed.

45. The system of claim 42, the Universal Serial Bus host to negotiate a common speed that is compatible with the calculated Universal Serial Bus cable length.

46. An apparatus comprising:
a Universal Serial Bus device to determine if a speed of a Universal Serial Bus cable of greater than a high speed is supported at each end of the Universal Serial Bus cable, to calculate the length of the Universal Serial Bus cable using a step response of the falling edge of a Universal Serial Bus DPlus signal, and to increase speed of the Universal Serial Bus cable beyond the high speed.

47. The apparatus of claim 46, wherein if the speed of the Universal Serial Bus cable of greater than the high speed is not supported at each end of the Universal Serial Bus cable, then the Universal Serial Bus device to not increase the speed of the Universal Serial Bus cable beyond the high speed.

48. The apparatus of claim 46, wherein if the calculated length of the Universal Serial Bus cable is 5 meters or more, then the Universal Serial Bus device to not increase the speed of the Universal Serial Bus cable beyond the high speed.

49. The apparatus of claim 46, the Universal Serial Bus device to negotiate a common speed that is compatible with the calculated Universal Serial Bus cable length.

50. The apparatus of claim 46, wherein the Universal Serial Bus device is a Universal Serial Bus host.

51. The apparatus of claim 46, wherein the high speed is 480 Mb per second.

* * * * *